United States Patent [19]
Childers et al.

[11] Patent Number: 5,625,778
[45] Date of Patent: Apr. 29, 1997

[54] METHOD AND APPARATUS FOR PRESENTING AN ACCESS REQUEST FROM A COMPUTER SYSTEM BUS TO A SYSTEM RESOURCE WITH REDUCED LATENCY

[75] Inventors: Brian A. Childers, Santa Clara; Eric A. Baden, Saratoga, both of Calif.

[73] Assignee: Apple Computer, Inc., Cupertino, Calif.

[21] Appl. No.: 434,193

[22] Filed: May 3, 1995

[51] Int. Cl.$^6$ .................................................. G06F 13/14
[52] U.S. Cl. ......................... 395/287; 395/292; 395/858; 395/859
[58] Field of Search ................................. 395/292, 858, 395/859

[56] References Cited

U.S. PATENT DOCUMENTS

| | | | |
|---|---|---|---|
| 4,682,284 | 7/1987 | Schrofer | 395/875 |
| 5,185,875 | 2/1993 | Chinnaswamy | 395/448 |
| 5,231,636 | 7/1993 | Rasmussen | 370/100.1 |
| 5,257,348 | 10/1993 | Roskowski et al. | 395/157 |
| 5,263,138 | 11/1993 | Wasserman et al. | 395/294 |
| 5,274,753 | 12/1993 | Roskowski et al. | 395/135 |
| 5,301,272 | 4/1994 | Atkins | 395/165 |
| 5,379,379 | 1/1995 | Becker et al. | 395/250 |
| 5,459,842 | 10/1995 | Begun et al. | 395/250 |

OTHER PUBLICATIONS

*PowerPC 601 RISC Microprocessor User's Manual*, pp. 2-42 through 2-70; 8-1 through 8-36; and 9-1 through 9-52, published by Motorola in 1993.
*PCI Local Bus Specification*, Review Draft Revision 2.1, published Oct. 21, 1994 by the PCI Special Interest Group, P.O. Box 14070, Portland, OR 97214.
*PCI Multimedia Design Guide*, Revision 1.0 (Mar. 29, 1994), which is distributed by the PCI Multimedia Working Group (part of the PCI Special Interest Group, P.O. Box 14070, Portland, OR 97214).

*Primary Examiner*—Jack B. Harvey
*Assistant Examiner*—Sumati Lefkowitz
*Attorney, Agent, or Firm*—Burns, Doane, Swecker & Mathis, L.L.P.

[57] ABSTRACT

A system has a system resource, such as a frame buffer, coupled to a system bus, the system bus conveying a request for access to the system resource from another system element connected to the system bus. An apparatus for presenting the access request to the system resource from the system bus includes a queue, a multiplexor that is preferably glitchless, and a controller. The queue has an input for receiving access request information from the system bus; one or more storage elements, each for storing access request information, wherein the one or more storage means are connected to form a queue having a head and a tail; and a queue output for supplying data stored in the head of the queue. The multiplexor has a first input coupled to the queue output, a second input for receiving the access request information from the system bus, and a multiplexor output for supplying the access request to the system resource. The controller is coupled to the queue and to the multiplexor, for initiating the loading of the access request information into the queue, and for initially causing the multiplexor to supply, at the multiplexor output, the access request information from the second input, and for subsequently causing, after the access request information becomes available at the queue output, the multiplexor to supply, at the multiplexor output, the access request information from the first input. This configuration reduces latency on read operations to the frame buffer.

8 Claims, 2 Drawing Sheets

METHOD AND APPARATUS FOR PRESENTING AN ACCESS REQUEST FROM A COMPUTER SYSTEM BUS TO A SYSTEM RESOURCE WITH REDUCED LATENCY

BACKGROUND

The present invention relates to computer graphics controllers for connection to frame buffers, more particularly to access requests made to such computer graphics controllers, and even more particularly to the queuing, within such computer graphics controllers, of frame buffer addresses that are received from a split-response bus.

In computer systems, it is known in the art to utilize a computer graphics controller to serve as an interface between a video frame buffer, such as a video random access memory (VRAM), and other system components, such as one or more central processing units (CPUs) and other video input resources. Typically, the video frame buffer is coupled to the other system components by means of a system bus which conveys both address and pixel data information. The frame buffer stores pixel data that is intended to be retrieved and converted, as necessary, for display on an image display device, such as a cathode ray tube (CRT). The hardware which retrieves the pixel data from the frame buffer for conversion and presentation to the image display device is not usually coupled to the system bus, but instead has its own port for accessing the frame buffer.

The amount of time necessary for the frame buffer to access a location (either for reading or storing a pixel) is typically much slower than the operating speed of the system components requesting such accesses. To accommodate this mismatch in component operating speeds, it is possible to require that each frame buffer access request be held off (i.e., made to wait) until the frame buffer is finished with a present task and is ready to begin the next. However, if the system components that are making the access requests are themselves held off until such requests are serviced by the frame buffer, then the system bus will be tied up, thereby making it impossible for other system resources to perform even non-video related tasks. It is apparent that this situation will detrimentally affect system performance.

The problem is further compounded by the type of system bus that is utilized. Several bus characteristics may vary from system to system. For example, a device connected to the bus may be a master, a slave, or both. A master uses the system bus to issue requests for service to different slaves. A slave uses the system bus to respond to requests for service from different masters. A device may at one time issue a request for service and at another time respond to a request for service, thereby functioning as both a master and a slave.

Until recently, most small computer systems had only a single bus master that, with relatively few exceptions, enjoyed unrestricted access to the system bus. More recently, however, some personal computer systems have adopted a strategy, previously employed in minicomputers and mainframe computers, in which multiple bus masters are permitted to compete for access to the system bus through an arbitration process. In a typical personal computer (PC), for example, arbitrating devices may include a system microprocessor, processor-board DMA channels and expansion-slot bus master devices. It can be seen that, in such a system, the hoarding of bus resources by one bus master can significantly impact the performance of other potential bus masters.

Another characteristic of buses that affects system performance relates to the fact that a typical computer system bus is conceptually divided into an address bus, a data bus and a control bus. A bus transaction is a complete exchange between two bus devices, and typically comprises both an address phase, during which address information is presented on the address bus, and a data phase during which data information is presented on the data bus. The data phase of a bus transaction may follow the address phase of the same transaction in ordered succession, without any other data phase of any other bus transaction intervening. In such a case, the system bus is said to be "tightly ordered." Small computer systems are, as a general rule, tightly ordered.

By contrast, in some minicomputer and mainframe computers, and more recently in some small computer architectures, buses are "loosely ordered" such that, between the address phase of a bus transaction and the corresponding data phase, other data phases of other bus transactions may occur. The ability of the bus to allow the address bus and data bus to have different masters at the same time is called "split-bus transaction capability". The PowerPC™ computer architecture, co-developed by Apple Computer, utilizes a loosely ordered system bus that provides split-bus transaction capability.

PowerPC™ machines currently sold by Apple are based largely on the Motorola MPC601 RISC microprocessor. The MPC601 permits separate address bus tenures and data bus tenures, where tenure is defined as the period of bus mastership. In other words, rather than considering the system bus as an indivisible resource and arbitrating for access to the entire bus, the address and data buses are considered as separate resources, and arbitration for access to these two buses may be performed independently. A transaction, or complete exchange between two bus devices, is minimally comprised of an address tenure; one or more data tenures may also be involved in the exchange. The address and data tenures of each access request must be arbitrated separately from one another. However, the request for a data bus tenure is not made explicitly, but is instead implied by the occurrence of a corresponding address bus request/transaction. More information about the particulars of the system bus in the MPC601 RISC microprocessor may be found in the *PowerPC 601 RISC Microprocessor User's Manual*, published by Motorola in 1993, which is incorporated herein by reference. Another loosely coupled system bus is described in U.S. patent application Ser. No. 08/432,620, which was filed by James Kelly et al. on May 2, 1995, and entitled BUS TRANSACTION REORDERING USING SIDE-BAND INFORMATION SIGNALS, and which is incorporated herein by reference.

Returning to the discussion of the effect that frame buffer access time has on system bus delays, it is apparent that the presence of split-bus transaction capability adds a level of complexity that must be accounted for in any queuing mechanism whose purpose is to serve as a buffer between the presentation of a frame buffer access request and the servicing of that request. An instance of this added complexity may be seen by considering a frame buffer write request. In such a case, the queuing mechanism must be able to queue up both the address and the data. However, as explained above, not only do these not appear during the same bus tenure, but there may be intervening data bus tenures that are unrelated to the address. Thus, the queuing mechanism must be able to associate arriving data with the corresponding address. In addition, the queuing mechanism must be able to handle the appearance of addresses that, because they are associated with frame buffer read requests, should be presented to the frame buffer as soon as the frame buffer is free; there is no associated data to wait for.

Therefore, it is desirable to provide a queuing mechanism for a graphics controller, which queuing mechanism is capable of operating efficiently in a split-bus transaction environment. It is further desired to provide a queuing mechanism that will not, itself, be the cause of unnecessary delays in presenting access requests to the frame buffer at the moment that the frame buffer becomes free to handle a new request.

SUMMARY

It is therefore an object of the present invention to provide a queuing mechanism for a graphics controller, which queuing mechanism is capable of operating efficiently in a split-bus transaction environment.

It is a further object of the invention to provide a queuing mechanism that will not, itself, be the cause of unnecessary delays in presenting access requests to the frame buffer at the moment that the frame buffer becomes free to handle a new request.

In accordance with one aspect of the present invention, the foregoing and other objects are achieved by an apparatus for use in a system that comprises a system resource coupled to a system bus, the system bus conveying a request for access to the system resource from another system element connected to the system bus. The purpose of the inventive apparatus is to present the access request to the system resource from the system bus. The apparatus comprises queuing means, multiplexing means, and control means. The queuing means comprises an input for receiving access request information from the system bus; one or more storage means, each for storing access request information, wherein the one or more storage means are connected to form a queue having a head and a tail; and a queue output for supplying data stored in the head of the queue.

The multiplexing means, which is preferably a glitchless multiplexor, has a first input for receiving the access request information from the system bus, a second input coupled to the queue output, and a multiplexing means output for supplying the access request to the system resource.

The control means is coupled to the queuing means and to the multiplexing means. The control means initiates the loading of the access request information into the queuing means, and also initially causes the multiplexing means to supply, at the multiplexing means output, the access request information from the first input. After the access request information becomes available at the queue output, the control means subsequently causes the multiplexing means to supply, at the multiplexing means output, the access request information from the second input.

The above arrangement may be applied to systems in which the system resource is a memory device, such as a video frame buffer, and the access request information may include address information as well as information indicating whether the requested access is a read or write operation. When applied in this way, the invention reduces latency on read operations because it allows the access request information to temporarily take a shorter path to the system resource until the information is settled at the output of the queuing means, from which it is subsequently accessed.

In another aspect of the invention, the above-described bypass structure is applied to an architecture employing first and second queuing means connected in series. A second multiplexing means may be employed, as described above, to reduce the latency associated with moving access request information from the output of the first queuing means to the output of the second queuing means. In this case, the second input of the first multiplexing means is connected to the output of the second multiplexing means, while the first input of the first multiplexing means continues to receive the access request information directly from system bus.

In this aspect of the invention, the apparatus may be coupled to a system bus having split-bus transaction capability. In this case, the second queuing means may be used to store access information associated exclusively with frame buffer write operations whose data tenures have occurred on the system bus, whereas the first queuing means exclusively retains all access request information associated with frame buffer read requests, and also those frame buffer write requests whose data tenures have not yet occurred on the system bus.

BRIEF DESCRIPTION OF THE DRAWINGS

The objects and advantages of the invention will be understood by reading the following detailed description in conjunction with the drawings in which.

DETAILED DESCRIPTION

Figure 1:
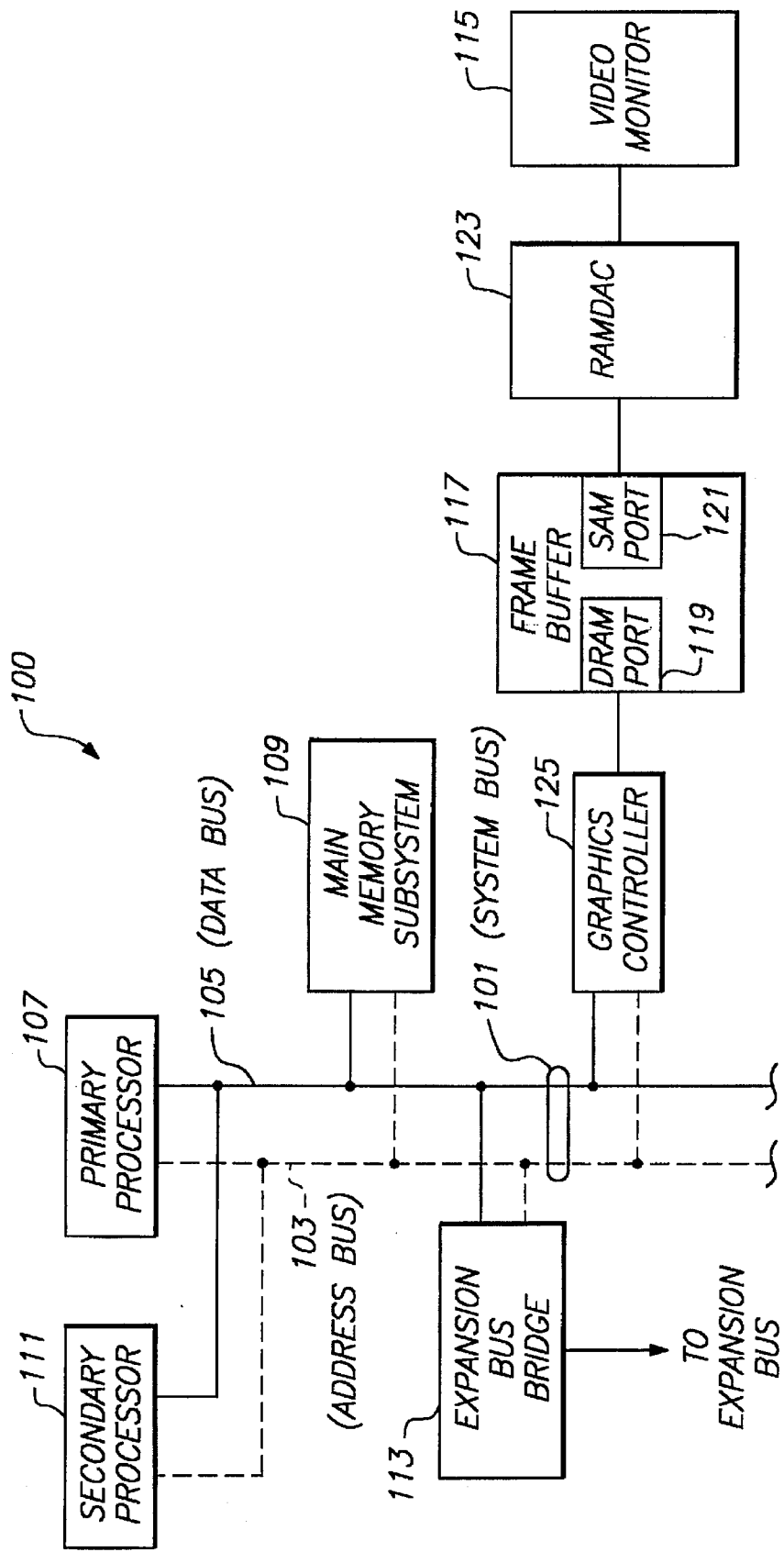
FIG. 1 is a block diagram of a computer system 100 of the type in which the present invention is incorporated.

The various features of the invention will now be described with respect to the figures, in which like parts are identified with the same reference characters.

Referring to FIG. 1, the present invention may be used in a computer system 100 of the type shown. The computer system 100 is based on a system bus 101 that comprises an address bus 103 and a data bus 105. Furthermore, the system bus 101 is of the loosely coupled type that has split-bus transaction capability as discussed above in the BACKGROUND section of this disclosure.

Attached to the system bus 101 is a primary processor 107, such as the PowerPC™ 601 microprocessor, that is capable of operating in a split-bus transaction environment. For purposes of simplifying the drawing, also attached to the system bus 101 is a block designated as main memory subsystem 109. Those having ordinary skill in the art will appreciate that the main memory subsystem 109 may comprise any combination of static or dynamic random access memory (SRAM or DRAM) as well as read only memory (ROM) and cache memory. For further simplification of the drawing, the main memory subsystem 109 also includes arbitration logic for resolving conflicting access requests made to the address and data buses 103, 105. A more detailed description of these features, which are well-known in the art, is beyond the scope of this disclosure.

In addition to the primary processor 107, the exemplary system 100 may further include a secondary processor 111 and an expansion bus bridge 113. The expansion bus bridge 113 allows the interconnection of an expansion bus (not shown) to the system bus 101. Thus, potential bus masters in the system 100 include not only the primary processor 107 and secondary processor 111, but also various other processors and data input and/or output devices that may be connected to the system bus 101 via the expansion bus bridge 113.

In the exemplary system, image data is displayed on a video monitor 115. An image to be displayed is stored in the frame buffer 117 as a set of pixels, the form of which may be in accordance with any of a number of well-known pixel formats, such as RGB and YUV. The frame buffer is a video random access memory (VRAM) which is a special type of DRAM that has a DRAM port 119 and a serial access memory (SAM) port 121, each for accessing the pixel data stored in the frame buffer 117. The SAM port 121 is connected to a RAMDAC 123, which reads the serial stream of pixel data from the frame buffer 117, and converts the digital bit stream into appropriate analog signals for driving the video monitor 115.

A graphics controller 125 is provided, which has an interface for connection to the system bus 101, and another interface for connection to the DRAM port 119 of the frame buffer 117. The function of the graphics controller 125 is to receive frame buffer access requests from the system bus 101 and provide these to the frame buffer 117 for servicing. As mentioned above in the BACKGROUND section of this disclosure, the address and data tenures associated with any one request have no fixed relationship with respect to one another, but instead may be separated by the occurrence of unrelated data tenures. With one exception that is not pertinent to this invention, the address and data transfers on the system bus 101 operate under the basic rule that each bus master's transactions are completed in the order that the bus master presents its addresses to the bus, and each slave's transactions are completed in the order in which the slave receives these addresses.

It can be seen that there are situations in which the graphics controller 125, having received an address from the address bus 103, must wait an indeterminate amount of time before presenting the access request to the frame buffer 117. For example, the frame buffer 117 may be unavailable as a result of uncompleted servicing of a previously received access request. In this case, the newly arrived access request must somehow be held off until the frame buffer 117 becomes available. This occurs irrespective of whether the newly arrived access request is for a write or a read operation.

Additionally, in the case of write requests, the frame buffer access cannot be started until the data has arrived via the data bus 105. As explained above, there is no fixed time period defined for the interval between arrival of an address and arrival of the corresponding data on a write request. Thus, even if the frame buffer 117 is available at the moment that the write address arrives, the desired access must be delayed.

In accordance with the invention, the graphics controller 125 accommodates the split-bus transaction capability of the system bus 101 by queuing all access addresses in the order in which they arrive from the address bus 103. For read operations, addresses are removed from the queue and presented to the frame buffer 117 as soon as the latter is available to receive a new access request. In the case of write operations, two conditions must be satisfied before the address will be removed from the queue and presented to the frame buffer 117: the frame buffer must be available to receive a new access request, and the data associated with that write operation must have arrived from the data bus 105.

The inventive graphics controller 125 includes a queuing structure to provide for proper presentation of access requests to the frame buffer 117. In accordance with another aspect of the invention, the queuing structure is provided with first and second bypass structures to eliminate delays associated with unnecessarily passing an address through an empty queue.

Figure 2:
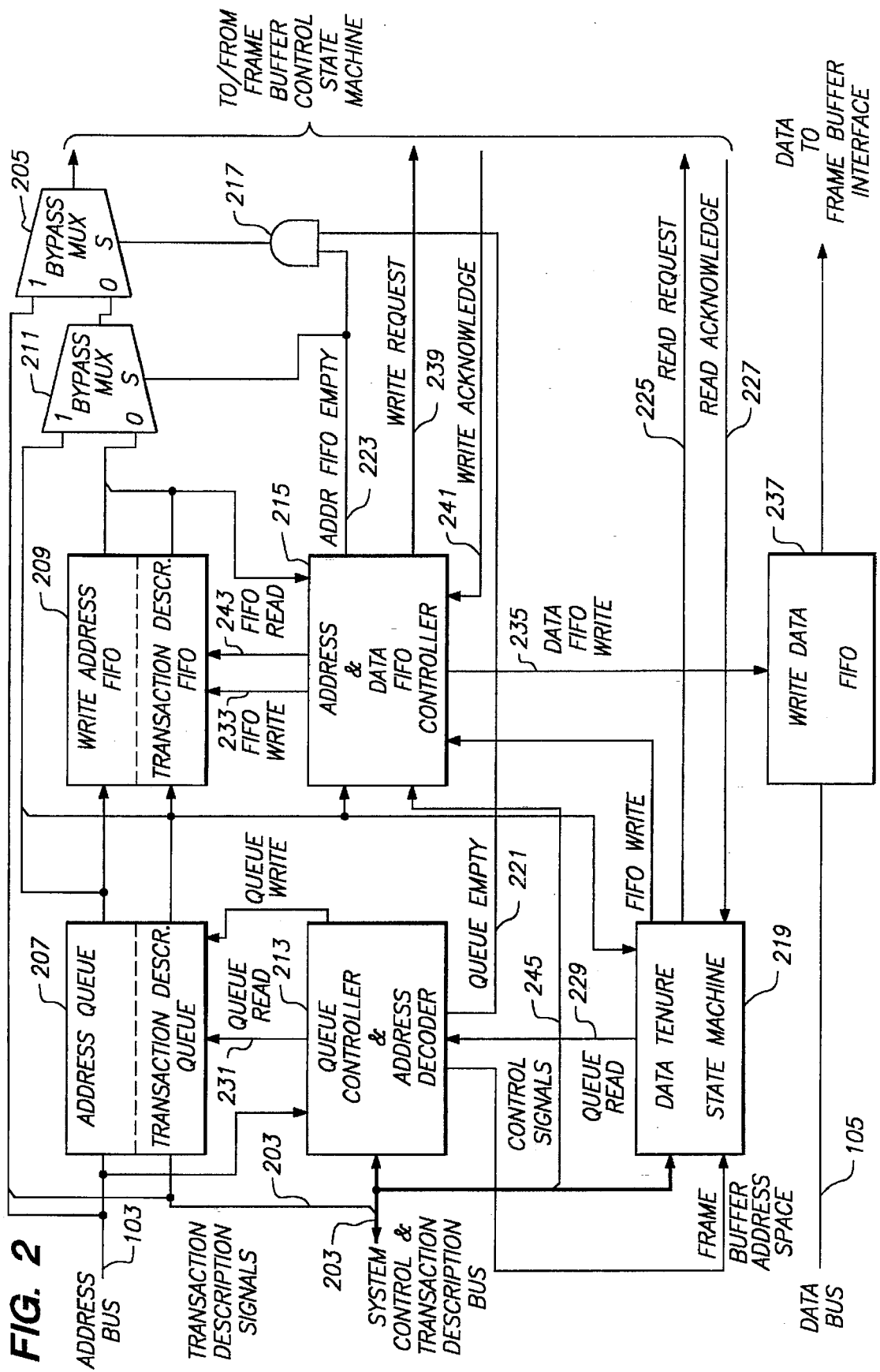
FIG. 2 is a block diagram of the queuing structure for a graphics controller in accordance with the present invention.

These features will now be described in greater detail with reference to FIG. 2, which shows the logic associated with the queuing structure that is contained within the graphics controller 125. The interface to the system bus 101 appears on the left side of the figure. The address bus 103 and data bus 105 are the same as those depicted in FIG. 1. In addition, system bus control signals 245 and transaction description signals 203 are shown arriving on a system control and transaction description bus 201 (omitted from FIG. 1 for the sake of simplifying the diagram). The transaction description signals 203 indicate characteristics of the bus transactions, such as read/write and burst access indicators as well as data size indicator signals. The control signals 245 convey the address and data tenure arbitration signals which are well-known in the art, and need not be described here in greater detail.

As shown in the exemplary embodiment, an address from the address bus 103 and its associated transaction description signals 203 are presented to a frame buffer control state machine (not shown) at the output of a first bypass multiplexor 205, which is preferably glitchless (i.e., if identical signals are presented at both inputs of the multiplexor, then changing the selection does not cause any signal transitions at the output of the multiplexor). To arrive at the output of the first bypass multiplexor 205, the address and transaction description signals may take any of three paths. For example, these signals may simply pass from their respective address bus 103 and system control and transaction description bus 201, through the "1" input of the first bypass multiplexor 205 to the output of that multiplexor. Alternatively, for reasons that will be explained below, these signals may first be loaded into respective inputs of a combined address/transaction description queue 207. The address/transaction description queue 207, which may be thought of as parallel queues controlled by the same set of signals, is preferably capable of storing two elements. Once the address and transaction description signals make their way to their respective outputs of the address/transaction description queue 207, they may again take one of two routes before appearing at the output of the first bypass multiplexor 205. First, they may be clocked into respective inputs of a combined write address/transaction description first-in-first-out (FIFO) memory 209, and from there through a "0" input of a second bypass multiplexor 211 whose output is supplied to a "0" input of the first bypass multiplexor 205. In a preferred embodiment, the combined write address/transaction description FIFO 209 is capable of storing eight elements. As an alternative path, the combined write address/transaction description FIFO 209 may be bypassed by routing the address and transaction description signals from the output of the combined address/transaction description queue 207 through a "1" input of the second bypass multiplexor 211 whose output, as explained above, is supplied to the "0" input of the first bypass multiplexor 205.

Selection of an address path is controlled by a queue controller/address decoder 213, an address and data FIFO controller 215, a logical AND gate 217 and a data tenure state machine 219. The coordinated operation of these elements will now be described by considering a number of possible scenarios.

Consider first the arrival of an address associated with a "read" operation at a time when the frame buffer 117 is idle (i.e., it has completed all earlier access requests). In this case, both the combined address/transaction description queue 207 and the combined write address/transaction description FIFO 209 will be empty, so that the QUEUE EMPTY signal 221 and the ADDR FIFO EMPTY signal 223, which are generated respectively by the queue controller/address decoder 213 and the address and data FIFO controller 215, will both be asserted. These signals are supplied to respective inputs of the AND gate 217, causing the output of this gate to be asserted (i.e., ="1"). The output of the AND gate 217 is supplied to a "select" input of the first bypass multiplexor 205, so that the address and transaction description signals appearing at the "1" input of the first bypass multiplexor 205 will appear at its output. In this way, a read address and its associated transaction description signals that arrive when the frame buffer 117 is not busy need not be delayed by passing through the various storage elements.

Meanwhile, the queue controller/address decoder 213 recognizes that the address on the address bus 103 indicates the frame buffer address space, and then, in response to a transaction start ("TS") signal being asserted on the system control and transaction description bus 201, causes the address and transaction description signals to be clocked into their respective inputs of the combined address/transaction description queue 207. These values pass directly to the output of the previously empty address/transaction description queue 207. A short time later, the QUEUE EMPTY signal 221 is deactivated (the address/transaction description queue 207 is no longer empty), which in turn causes the select signal of the first bypass multiplexor 205 to select the signals from its "0" input. This input is fed from the output of the second bypass multiplexor 211 which, because the ADDR FIFO EMPTY signal 223 is still asserted, selects the signals from its "1" input. In this way, the output of the first bypass multiplexor 205 is now supplied by the combined outputs of the combined address/transaction description queue 207. However, because the first bypass multiplexor 205 is preferably glitchless, no change in its output occurs when its select line changes from "1" to "0".

At this point, the data tenure state machine 219, which also recognizes the assertion of the TS signal, asserts a READ REQUEST 225 signal to the frame buffer control state machine. This causes the frame buffer control state machine to initiate the requested read operation in accordance with well known techniques.

When the frame buffer 117 has retrieved the requested data, the frame buffer control state machine asserts the READ ACKNOWLEDGE signal 227. In accordance with a preferred embodiment of the invention, the data tenure state machine would, at this point, take the necessary steps to negotiate for a data tenure on the data bus 105, and move the data from a read data FIFO (not shown) onto the data bus 105. However, this aspect is not critical to the invention, and need not be described in greater detail.

Also in response to the READ ACKNOWLEDGE signal 227, the data tenure state machine 219 issues a QUEUE READ signal 229 which, in turn, causes the queue controller/address decoder 213 to issue a QUEUE READ signals 231 to the address/transaction description queue 207. Since, in our example, no further read or write requests have been made, the QUEUE EMPTY signal 221 is again asserted, and the READ REQUEST signal 225 is deactivated.

NOW consider the case where an address associated with a "write" operation arrives at a time when the frame buffer 117 is idle (i.e., it has completed all earlier access requests). In this case, both the combined address/transaction description queue 207 and the combined write address/transaction description FIFO 209 will be empty, so that the QUEUE EMPTY signal 221 and the ADDR FIFO EMPTY signal 223, which are generated respectively by the queue controller/address decoder 213 and the address and data FIFO controller 215, will both be asserted. As described more fully above, these signals cause the address bus signals and transaction description signals 203 to be routed through the "1" input of the first bypass multiplexor 205 to the frame buffer control state machine. However, since this is a write operation, these signals cannot be immediately used. Rather, it is necessary to wait for the associated data tenure to occur, so that both the address and the data can be presented to the frame buffer 117.

The queue controller/address decoder 213 recognizes that the address on the address bus 103 indicates the frame buffer address space, and then, in response to a transaction start ("TS") signal being asserted on the system control and transaction description bus 201, causes the address and transaction description signals to be clocked into their respective inputs of the combined address/transaction description queue 207. These values pass directly to the output of the previously empty address/transaction description queue 207. A short time later, the QUEUE EMPTY signal 221 is deactivated (the address/transaction description queue 207 is no longer empty), which, as more fully described above with respect to the "read" operation, causes the output of the first bypass multiplexor 205 to be supplied by the combined outputs of the combined address/transaction description queue 207. However, it is again the case that these signals cannot be used by the frame buffer control state machine because the associated data has yet to arrive.

Both the data tenure state machine 219 and the address and data FIFO controller 215 monitor the system control and transaction description bus 201 for the occurrence of the associated data tenure. When it occurs, the data tenure state machine 219 asserts the QUEUE READ signal 229, which causes the queue controller/address decoder 213 to read the values stored in the address/transaction description queues 207. At the same time, the address and data FIFO controller issues FIFO write and data FIFO write signals 233, 235, respectively, to the write address/transaction description FIFO 209 and to the write data FIFO 237. In this way, the write address and transaction description signals are moved from the address/transaction description queue 207 to the write address/transaction description FIFO 209, and the data from the data bus 105 is clocked into the write data FIFO 237. Concurrent with these operations, the address and data FIFO controller 215 also issues a WRITE REQUEST signal 239 to the frame buffer control state machine, so that the write operation will be initiated. (In the exemplary embodiment, the system bus 101 is always much faster than the frame buffer 117, so that there is no danger that the frame buffer control state machine will attempt to store data that has not yet arrived.)

It is noted that, between the time that the write address and transaction description signals are clocked into the write address/transaction description FIFO 209 and the time that these signals appear at the output of the write address/transaction description FIFO 209, there is a not-insignificant delay. In accordance with another aspect of this invention, this delay is avoided, by temporarily routing these signals from the output of the address/transaction description queue 207 through the "1" input of the second bypass multiplexor 211. The "1" input of this multiplexor will be selected until the values appear at the respective outputs of the write address/transaction description FIFO, at which time the ADDR FIFO EMPTY signal 223 is deactivated, thereby causing the second bypass multiplexor 211 to select the signals from its "0" input. Again, the second bypass multiplexor 211 is preferably glitchless, so that no unwanted transitions appear at the output of the second bypass multiplexor 211.

If the requested write operation is a "burst write", then the data tenure state machine 219 must continue to monitor the system control and transaction description bus 201 for the occurrence of the remaining data tenures. In a preferred embodiment, a burst write comprises a total of four data elements, although this number is by no means critical to the operation of the invention.

When the frame buffer control state machine no longer requires the address and transaction description signals from the output of the first bypass multiplexor 205, it indicates this by asserting the WRITE ACKNOWLEDGE signal 241 to the address and data FIFO controller 215. In response, the address and data FIFO controller 215 asserts the FIFO READ signal 243, which causes the next item in the write address/transaction description FIFO to appear at the output. Since, in this example, no other values were loaded, the write address/transaction description FIFO 209 is now empty, and the state of the exemplary queue structure is as it was at the start of this example.

It will be observed from the above two examples, that the purpose of the address/transaction description queue 207 is to store only those addresses/transaction description signals which are either associated with a read operation, or else are associated with write operations whose data tenures have not yet begun. It will further be observed that the purpose of the write address/transaction description signal FIFO 209 is to store only those addresses/transaction description signals that correspond to write operations for which at least one data tenure has occurred.

To understand how the invention operates when a read or write operation arrives at a time the frame buffer 117 is not idle, consider an example in which a write operation is in progress. It is apparent from the above discussion that this means that the corresponding write address and transaction description signals are at the head of the write address/transaction description FIFO 209. It will be assumed, for the sake of this example, that no other values are stored in write address/transaction description FIFO 209 or in the address/transaction description queue 207.

If an access request for a write operation arrives on the system bus 101 at this time, the operation will be as described above. That is, the write address and transaction description signals will be caused to be loaded into the address/transaction description queue 207. Note, however, that because the write address/transaction description FIFO 209 is not empty, the values associated with the ongoing write operation continue to appear at the output of the first bypass multiplexor 205.

The newly arrived write address and transaction description signals make their way to the head of the address/transaction description queue 207. The data tenure state machine 219 and the address and data FIFO controller 215 can both monitor the transaction description signals being emitted from the output of the address/transaction description queue 207, so they know that another write operation is pending. When the associated data tenure eventually occurs on the data bus 105, the data value is clocked into the write data FIFO 237, and the write address and transaction description signals are removed from the address/transaction description queue 207 and clocked into the write address/transaction description FIFO 209 in the same manner as fully described above with respect to write operations. The only difference from the previously explained example is that these values will not move to the head of the write address/transaction description FIFO 209 until the ongoing write operation completes. When this occurs, the assertion of FIFO READ 243 dumps the old values from the write address/transaction description FIFO 209, and moves the next data items to the head of the FIFO. In this case, the ADDR FIFO EMPTY signal 223 remains deactivated, and another WRITE REQUEST signal 239 is issued to the frame buffer control state machine. The write operation continues as previously described.

As another example, consider the case where a write operation is in progress, and another one is queued behind it in the write address/transaction description FIFO 209. Assume, further, that the address/transaction description queue 207 is empty. If an access request for a read operation arrives on the system bus 101, it will be clocked into the address/transaction description queue 207 as described in previous examples. Although these values move to the head of the address/transaction description queue, they do not appear at the output of the first bypass multiplexor 205, which instead obtains its values from the non-empty write address/transaction description FIFO 209. The data tenure state machine 219, observing that the transaction description signals emanating from the output of the address/transaction description queue 207, asserts the READ REQUEST signal 225. However in the exemplary embodiment, the frame buffer control state machine is designed to ignore the READ REQUEST signal 225 whenever the WRITE REQUEST signal 239 is concurrently active, which is the case when a write operation is still being performed. Accordingly, no read operation will be started by the frame buffer 117. Instead, the queued read address and transaction description signals will remain at the head of the address/transaction description queue 207 until each of the pending write operations have been completed, and the write address/transaction description FIFO 209 thereby emptied. When this occurs, the WRITE REQUEST signal 239 will be deactivated, and the frame buffer control state machine will then take the necessary steps to initiate the read operation.

It should be observed that if yet another write access request is queued up behind a read access request in the address/transaction description queue 207, there is no danger that it's associated data tenure can occur before the write access request is at the head of the address/transaction description queue 207, since the system bus architecture requires that data tenures occur in the order in which address bus requests are presented to the bus arbiter (part of the main memory subsystem 109). Since the data tenure for the pending read access request cannot occur until the frame buffer retrieves this data, the system bus arbiter will not grant the data bus 105 to another system component that is attempting to write data to the frame buffer 117. (Another system component may, however, be granted a data tenure to transfer data to a destination other than the frame buffer 117.)

In the above description, a distinction has been made between the designation "queue" and the designation "FIFO". As used throughout this description, both terms are intended to refer to memory devices having a plurality of storage cells, in which retrieval is normally in the order of first-in-first-out. However, for purposes of this description, the queue has an additional feature in that it is possible to remove an element from the tail of the queue. This is advantageous because, in the preferred embodiment, the system bus 101 allows a write or read operation to be aborted after it has been initiated. In this case, the queue controller/address decoder 213 has the ability to remove address and transaction description signals from the address/transaction description queue 207 in the event that these values become invalid (i.e., associated with an access request that has been aborted.)

The invention has been described with reference to a particular embodiment. However, it will be readily apparent to those skilled in the art that it is possible to embody the invention in specific forms other than those of the preferred embodiment described above. This may be done without departing from the spirit of the invention. For example, the queues and FIFOs may be sized differently from the values indicated above. Also, the system bus 101 may be of a type other than that presented in this example.

Furthermore, the inventive queuing mechanism is not restricted for use only with frame buffers, but instead may be adapted for use with other types of memory devices as well as with other types of system resources (e.g., bus bridges) for which requests may be made via a system bus.

Accordingly, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a system comprising a system resource coupled to a system bus, the system bus conveying a request for access to the system resource from another system element connected to the system bus, an apparatus for presenting the access request to the system resource from the system bus, the apparatus comprising:

queuing means comprising:
  an input for receiving access request information from the system bus;
  one or more storage means, each for storing access request information, wherein the one or more storage means are connected to form a queue having a head and a tail; and
  a queue output for supplying data stored in the head of the queue;

multiplexing means having a first input for receiving the access request information from the system bus, a second input coupled to the queue output, and a multiplexing means output for supplying the access request information to the system resource; and control means, coupled to the queuing means and to the multiplexing means, for initiating the loading of the access request information into the queuing means, and for initially causing the multiplexing means to supply, at the multiplexing means output, the access request information from the first input, and for subsequently causing, after the access request information becomes available at the queue output, the multiplexing means to supply, at the multiplexing means output, the access request information from the second input.

2. The apparatus of claim 1, wherein the multiplexing means is a glitchless multiplexor.

3. In a system comprising a memory resource coupled to a system bus, the system bus conveying a request for access to the system memory resource from another system element connected to the system bus, an apparatus for presenting the access request to the system memory resource from the system bus, the apparatus comprising:

first queuing means comprising:
  an input for receiving access request information from the system bus;
  one or more storage means, each for storing access request information, wherein the one or more storage means are connected to form a first queue having a head and a tail; and
  a first queue output for supplying data stored in the head of the first queue;

first multiplexing means having a first input for receiving the access request information from the system bus, a second input coupled to a second multiplexing means output, and a first multiplexing means output for supplying the access request information to the system resource;

a second queuing means comprising:
  an input for receiving access request information from the first queue output;
  one or more storage means, each for storing access request information, wherein the one or more storage means are connected to form a second queue having a head and a tail; and
  a second queue output for supplying data stored in the head of the second queue;

the second multiplexing means having a first input for receiving the access request information from the first queue output, a second input coupled to the second queue output, and a second multiplexing means output for supplying the access request information to the second input of the first multiplexing means;

first control means, coupled to the first queuing means and to the first multiplexing means, for initiating the loading of the access request information into the first queuing means, and for initially causing the first multiplexing means to supply, at the first multiplexing means output, the access request information from the first input of the first multiplexing means, and for subsequently causing, after the access request information becomes available at the first queue output, the first multiplexing means to supply, at the first multiplexing means output, the access request information from the second input of the first multiplexing means; and second control means, coupled to the second queuing means and to the second multiplexing means, for initiating the loading of the access request information into the second queuing means, and for initially causing the second multiplexing means to supply, at the second multiplexing means output, the access request information from the first input of the second multiplexing means, and for subsequently causing, after the access request information becomes available at the second queue output, the second multiplexing means to supply, at the second multiplexing means output, the access request information from the second input of the second multiplexing means.

4. In a system comprising a system resource coupled to a system bus, the system bus conveying a request for access to the system resource from another system element connected to the system bus, a method of presenting the access request to the system resource from the system bus, the method comprising the steps of:

receiving access request information from the system bus;

supplying the received access request information to an input of a queue and to a first input of selecting means for presenting the access request information to the system resource;

supplying an output from the queue to a second input of the selecting means;

initiating loading of the access request information into the queue; and controlling the selecting means to initially select the first input for presentation to the system resource, and to subsequently select the second input for presentation to the system resource after the access request information becomes available at an output of the queue.

5. The method of claim 4, wherein the selecting means is a glitchless multiplexor.

6. In a system comprising a memory resource coupled to a system bus, the system bus conveying a request for access to the system memory resource from another system element connected to the system bus, a method for presenting the access request to the system memory resource from the system bus, the method comprising the steps of:

receiving access request information from the system bus;

supplying the received access request information to an input of a first queue and to a first input of first selecting means for presenting the access request information to the system resource;

supplying an output from the first queue to an input of a second queue and to a first input of second selecting means;

supplying an output from the second queue to a second input of the second selecting means;

supplying an output of the second selecting means to a second input of the first selecting means;

initiating loading of the access request information into the first queue from the system bus;

initiating loading of the access request information into the second queue from an output of the first queue;

controlling the second selecting means to initially select the first input for output to the first selecting means, and to subsequently select the second input for output to the first selecting means after the access request information becomes available at an output of the second queue; and controlling the first selecting means to initially select the first input for presentation to the system resource, and to subsequently select the second input for presentation to the system resource after the access request information becomes available at an output of the first queue.

7. In a system comprising a system resource coupled to a system bus that includes separate address and data lines the system bus further having split-bus transaction capability, wherein the system bus conveys a request for access to the system resource from another system element connected to the system bus, an apparatus for presenting the access request to the system resource from the system bus, the apparatus comprising:

first queuing means comprising:
an input for receiving access request information from the system bus;
one or more storage means, each for storing access request information, wherein the one or more storage means are connected to form a first queue having a head and a tail; and
a first queue output for supplying data stored in the head of the queue;

a second queuing means comprising:
an input for receiving access request information from the first queue output;
one or more storage means, each for storing access request information, wherein the one or more storage means are connected to form a second queue having a head and a tail; and
a second queue output for supplying data stored in the head of the second queue;

multiplexing means having a first input coupled to the first queue output, a second input coupled to the second queue output, and a multiplexing means output for supplying the access request information to the system resource; and control means comprising:
means for loading the received access request information into the first queue;
means, responsive to the access request information indicating a write operation, for loading the access request information into the second queuing means from the first queue output in response to an occurrence of a data tenure associated with the access request information; and
selection control means for causing the multiplexing means to select the first input in response to the second queuing means being empty, and to select the second input in all other cases.

8. In a system comprising a system resource coupled to a system bus that includes separate address and data lines, the system bus further having split-bus transaction capability, wherein the system bus conveys a request for access to the system resource from another system element connected to the system bus, a method of presenting the access request to the system resource from the system bus, the method comprising the steps of:

receiving access request information from the system bus;

supplying the received access request information to an input of a first queue;

supplying an output from the first queue to an input of a second queue and to a first input of selecting means for presenting the access request information to the system resource;

supplying an output from the second queue to a second input of the selecting means;

supplying an output of the selecting means to the system resource;

loading the receiving access request information into the first queue;

in response to the access request information indicating a write operation, loading the access request information into the second queue from the first queue output in response to an occurrence of a data tenure associated with the access request information; and causing the selecting means to select the first input in response to the second queuing means being empty, and to select the second input in all other cases.

* * * * *